United States Patent
Liu et al.

(10) Patent No.: US 10,513,607 B2
(45) Date of Patent: Dec. 24, 2019

(54) RESIN COMPOSITION AND USES OF THE SAME

(71) Applicant: TAIWAN UNION TECHNOLOGY CORPORATION, Chupei, Hsinchu County (TW)

(72) Inventors: Shur-Fen Liu, Chupei (TW); Meng-Huei Chen, Chupei (TW)

(73) Assignee: TAIWAN UNION TECHNOLOGY CORPORATION, Chupei, Hsinchu County (TW)

( * ) Notice: Subject to any disclaimer, the term of this patent is extended or adjusted under 35 U.S.C. 154(b) by 392 days.

(21) Appl. No.: 15/298,568

(22) Filed: Oct. 20, 2016

(65) Prior Publication Data

US 2018/0030267 A1 Feb. 1, 2018

(30) Foreign Application Priority Data

Jul. 29, 2016 (TW) .............................. 105124063 A

(51) Int. Cl.

| C08L 71/12 | (2006.01) |
|---|---|
| B32B 1/00 | (2006.01) |
| C08K 5/3492 | (2006.01) |
| C08L 79/08 | (2006.01) |
| C08J 5/10 | (2006.01) |
| B05D 1/18 | (2006.01) |
| B05D 3/00 | (2006.01) |

(Continued)

(52) U.S. Cl.
CPC .............. *C08L 71/123* (2013.01); *B05D 1/18* (2013.01); *B05D 3/007* (2013.01); *B32B 1/00* (2013.01); *C08J 5/10* (2013.01); *C08J 5/24* (2013.01); *C08K 5/3492* (2013.01); *C08K 5/34924* (2013.01); *C08L 79/085* (2013.01); *C08G 73/126* (2013.01); *C08J 2371/12* (2013.01); *C08J 2379/08* (2013.01); *C08J 2409/00* (2013.01); *C08J 2435/00* (2013.01); *C08K 2201/005* (2013.01); *C08L 2201/02* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| 2007/0077413 A1* | 4/2007 | Amou ................... B32B 5/26 428/323 |
|---|---|---|
| 2015/0044485 A1* | 2/2015 | Wang ................... H05K 1/0353 428/462 |
| 2016/0185904 A1 | 6/2016 | Gao et al. |

FOREIGN PATENT DOCUMENTS

TW 201623372 A 7/2016

\* cited by examiner

*Primary Examiner* — Ana L. Woodward
(74) *Attorney, Agent, or Firm* — Michael W. Ferrell; Ferrellis, PLLC; Anna L. Kinney

(57) ABSTRACT

A resin composition is provided. The resin composition comprises the following components:
(a) a thermal-curable resin system, which has a dielectric loss (Df) of not higher than 0.008 at 10 GHz and comprises a bismaleimide resin of the following formula (I),

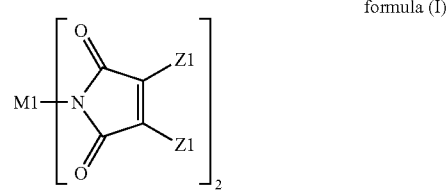

formula (I)

wherein M1 and the Z1 groups are as defined in the specification; and
(b) an organic compound of the following formula (II) or formula (III),

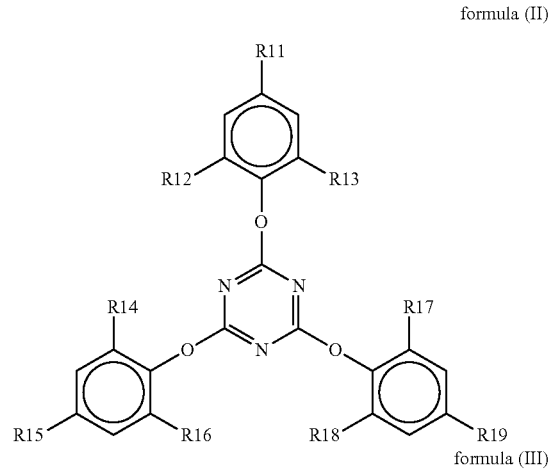

formula (II)

formula (III)

wherein R', R11 to R19 and R21 to R28 are as defined in the specification, (Continued)

and wherein the amount of the organic compound (b) ranges from 1 wt % to 30 wt % based on the total weight of the resin system (a) and the organic compound (b).

12 Claims, No Drawings

(51) Int. Cl.
*C08J 5/24* (2006.01)
*C08G 73/12* (2006.01)

RESIN COMPOSITION AND USES OF THE SAME

CLAIM FOR PRIORITY

This application claims the benefit of Taiwan Patent Application No. 105124063 filed on Jul. 29, 2016, the subject matters of which are incorporated herein in their entirety by reference.

BACKGROUND OF THE INVENTION

Field of the Invention

The present invention provides a resin composition, especially a resin composition that comprises a specific organic compound. The present invention also provides a prepreg and laminate provided by using the resin composition.

Descriptions of the Related Art

Printed circuit boards (PCBs) are circuit substrates that are used for electronic devices to load other electronic components and to electrically connect the components to provide a stable circuit working environment. One kind of conventional printed circuit board is a copper clad laminate (CCL), which is primarily composed of resin(s), reinforcing material(s) and copper foil(s). Examples of resins include epoxy resins, phenolic resins, polyamine formaldehyde resins, silicone resins, and Teflon. Examples of reinforcing materials include glass fiber cloths, glass fiber mats, insulating papers, and linen cloths.

In general, a printed circuit board can be prepared by using the following method: immersing a reinforcing material such as a glass fiber fabric into a resin (such as epoxy resin), and curing the immersed glass fiber fabric into a half-cured state, i.e., B-stage, to obtain a prepreg; superimposing certain layers of the prepregs and superimposing a metal foil on at least one external surface of the superimposed prepregs to provide a superimposed object; hot-pressing the superimposed object, i.e., C-stage, to obtain a metal clad laminate; etching the metal foil on the surface of the metal clad laminate to form a defined circuit pattern; and finally, drilling a plurality of holes on the metal clad laminate and plating these holes with a conductive material to form via holes to accomplish the preparation of the printed circuit board.

With the miniaturization of electronic devices, printed circuit boards must be very thin and made more densely to include more active and passive components. However, thin printed circuit boards prepared by using known resin compositions have disadvantages of poor adhesion strength between the cured resin composition and metal clad, as well as low durability. Therefore, there is a need for a resin composition which has outstanding peeling strength and adhesion strength to a metal clad.

SUMMARY OF THE INVENTION

An objective of the present invention is to provide a resin composition, which comprises the following:
(a) a thermal-curable resin system, which has a dielectric loss (Df) of not higher than 0.008 at 10 GHz and comprises a bismaleimide resin of the following formula (I),

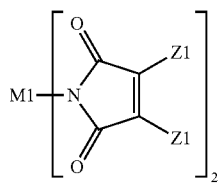

formula (I)

wherein M1 is an organic group, and each Z1 is independently H, halogen, or $C_1$-$C_5$ alkyl; and (b) an organic compound of the following formula (II) or (III),

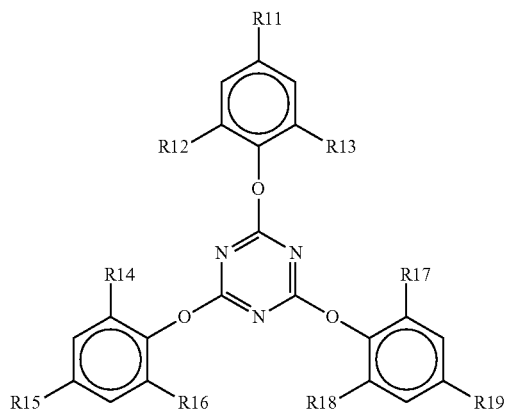

formula (II)

formula (III)

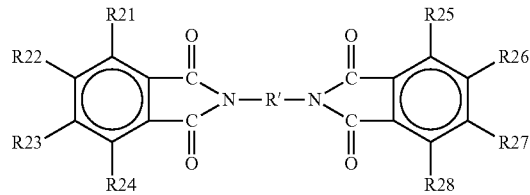

wherein R' is an organic group, and R11 to R19 and R21 to R28 are independently selected from the group consisting of H, Br, and $C_1$-$C_6$ hydrocarbyl, and wherein the amount of the organic compound (b) ranges from 1 wt % to 30 wt % based on the total weight of the resin system (a) and the organic compound (b).

Another objective of the present invention is to provide a prepreg, which is prepared by immersing a substrate into the resin composition described above, and drying the immersed substrate.

Yet another objective of the present invention is to provide a laminate, comprising a synthetic layer and a metal layer, wherein the synthetic layer is made from the prepreg described above.

To render the above objectives, the technical features and advantages of the present invention more apparent, the present invention will be described in detail with reference to some embodiments hereinafter.

BRIEF DESCRIPTION OF THE DRAWINGS

Not applicable.

DESCRIPTION OF THE PREFERRED EMBODIMENT

Hereinafter, some embodiments of the present invention will be described in detail. However, without departing from the spirit of the present invention, the present invention may be embodied in various embodiments and should not be limited to the embodiments described in the specification. Furthermore, for clarity, the size of each element and each area may be exaggerated in the appended drawings and not depicted in actual proportion. Unless it is additionally explained, the expressions "a," "the," or the like recited in the specification (especially in the claims) should include both the singular and the plural forms. Furthermore, unless it is additionally explained, while describing the constituents in the solution, mixture and composition in the specification, the amount of each constituent is calculated based on the solid content, i.e., regardless of the weight of the solvent.

Resin Composition

The present invention provides a resin composition with excellent flame retardance. In the resin composition, a resin system with specific electrical properties and an organic compound with a specific structure are used in combination, so that the laminate prepared thereby could be provided with satisfactory physicochemical properties and excellent flame retardance, heat resistance and peeling strength without affecting its electrical properties. Specifically, the resin composition of the present invention comprises a thermal-curable resin system (a) and an organic compound (b). Hereinafter, detailed descriptions are provided for each constituent of the resin composition of the present invention.

[Resin System (a)]

In the resin composition of the present invention, the resin system (a) has a dielectric loss (Df) of not higher than 0.008 at 10 GHz and comprises a bismaleimide resin of the following formula (I).

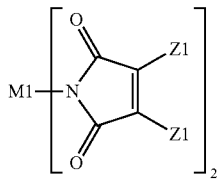

formula (I)

In formula (I), M1 is an organic group, and each Z1 is independently H, halogen, or $C_1$-$C_5$ alkyl. M1 is preferred to be a $C_2$-$C_{40}$ divalent group and is aliphatic, alicyclic, aromatic, or heterocyclic. M1 is more preferred to be substituted or unsubstituted methylene (—$CH_2$—), 4,4'-diphenylmethane

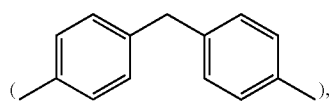

m-phenylene

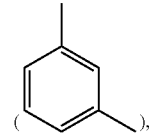

bisphenol A diphenyl ether

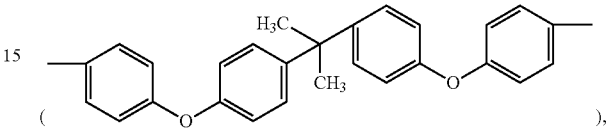

3,3'-dimethyl-5,5'-diethyl-4,4'-diphenyl methane

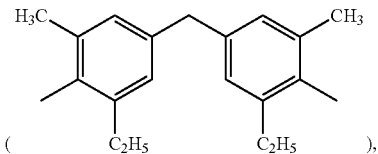

4-methyl-1,3-phenylene

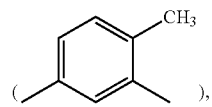

or (2,2,4-trimethyl)hexane

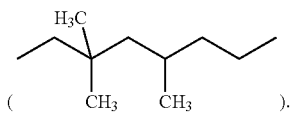

In some embodiments of the present invention, M1 is

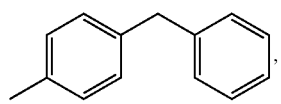

and both Z1 groups are H.

Specific examples of the bismaleimide resin of formula (I) include but are not limited to 1,2-bismaleimidoethane, 1,6-bismaleimidohexane, 1,3-bismaleimidobenzene, 1,4-bismaleimidobenzene, 2,4-bismaleimidotoluene, 4,4'-bismaleimidodiphenylmethane, 4,4'-bismaleimidodiphenylether, 3,3'-bismaleimidodiphenylsulfone, 4,4'-bismaleimidodiphenylsulfone, 4,4'-bismaleimidodicyclohexylmethane, 3,5-bis(4-maleimidophenyl)pyridine, 2,6-bismaleimidopyridine, 1,3-bis(maleimidomethyl)cyclohexane, 1,3-bis(maleimidomethyl)benzene, 1,1-bis(4-maleimidophenyl)cyclohexane, 1,3-bis(dichloromaleimido)benzene, 4,4'- biscitraconimidodiphenylmethane, 2,2-bis(4-maleimidophenyl)propane, 1-phenyl-1,1-bis(4-maleimidophenyl)ethane, α,α-bis(4-maleimidophenyl)toluene, 3,5-bismaleimido-1,2,4-triazole, N,N'-ethylenebismaleimide, N,N'-hexamethylenebismaleimide, N,N'-m-phenylenebismaleimide, N,N'-p-phenylenebismaleimide, N,N'-4,4'-diphenylmethanebismaleimide, N,N'-4,4'-diphenyletherbismaleimide, N,N'-4,4'-diphenylsufonebismaleimide, N,N'-4,4'-dicyclohexylmethanebismaleimide, N,N'-α,α'-4,4'-dimethylenecyclohexane bismaleimide, N,N'-m-xylenebismaleimide, N,N'-4,4'-diphenylcyclohexanebismaleimide, and N,N'-methylenebis(3-chloro-p-phenylene) bismaleimide.

In addition to the bismaleimide resin of formula (I), the resin system (a) may further comprise other thermal-curable resin components that can be gradually cured by forming a network structure through a heat treatment, as long as the resin system (a) as a whole satisfies the condition that the dielectric loss (Df) thereof is not higher than 0.008 at 10 GHz. Examples of said other thermal-curable resin components include but are not limited to polyphenylene ether derivative resins, isocyanurates containing vinyl or allyl, elastomers containing butadiene and/or styrene and having a functional group, and epoxy resins. The resin system (a) may comprise one or more of the above mentioned thermal-curable resin components. In some embodiments of the present invention, the resin system (a) comprises a bismaleimide resin, a polyphenylene ether derivative resin, and at least one of the following: a isocyanurate containing vinyl or allyl, an elastomer containing butadiene and/or styrene and having a functional group, and an epoxy resin.

Examples of the polyphenylene ether derivative resin include but are not limited to polyphenylene ether derivative resins with acrylic acid group(s), polyphenylene ether derivative resins with vinyl group(s), and polyphenylene ether derivative resins with hydroxyl group(s). Each of the aforementioned polyphenylene ether derivative resins may be used alone or in combination. For example, polyphenylene ether derivative resins may have the structure of the following formula (IV):

formula (IV)

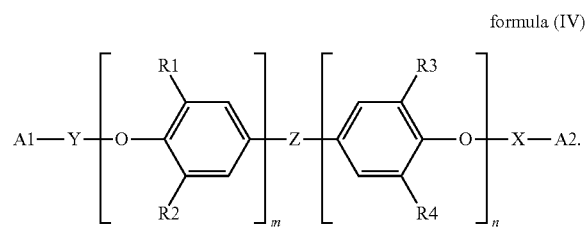

In formula (IV), X and Y are independently

an alkenyl-containing group or absent. It is preferred that X and Y are independently absent or

or X has the structure of the following formula (IV-1) and Y has the structure of the following formula (IV-2):

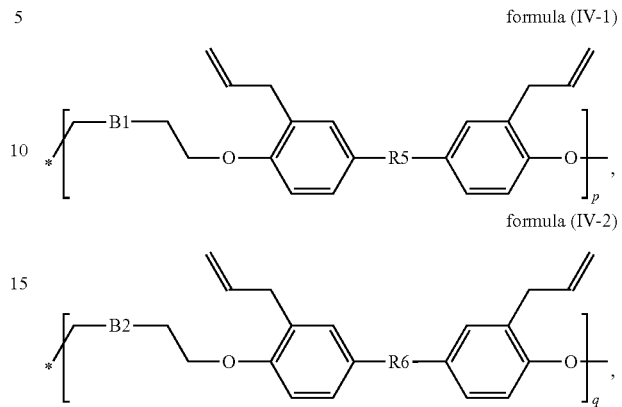

formula (IV-1)

formula (IV-2)

in formulas (IV-1) and (IV-2),

* indicates the end connecting oxygen (—O—) of formula (IV);

B1 and B2 are independently

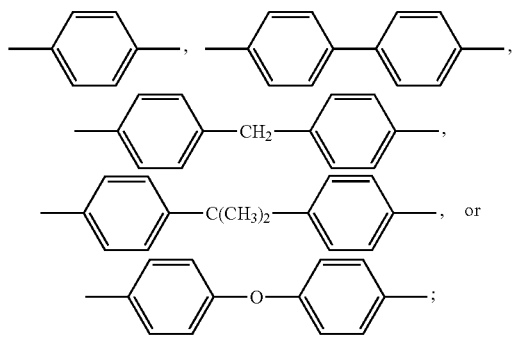

R5 and R6 are independently —O—, —SO$_2$—, or —C(CH$_3$)$_2$—, or absent; and p and q are independently an integer, and $1 \leq p+q < 20$, preferably $1 \leq p+q < 10$, and more preferably $1 \leq p+q < 3$;

R1, R2, R3 and R4 are independently H or substituted or unsubstituted C$_1$-C$_5$ alkyl, such as methyl, ethyl, n-propyl, isopropyl, n-butyl, and the like;

m and n are independently an integer ranging from 0 to 100, with the proviso that m and n are not 0 at the same time, and preferably an integer ranging from 10 to 60;

A1 and A2 are independently selected from the group consisting of

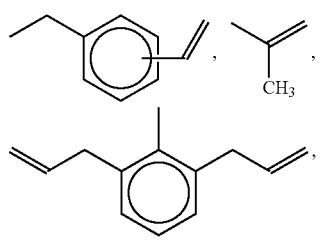

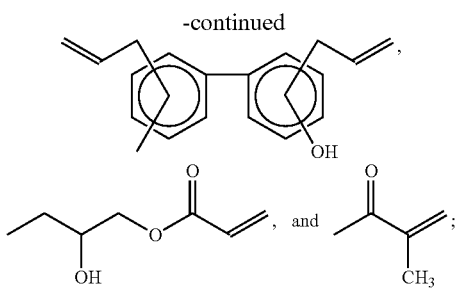

, and and
Z is absent

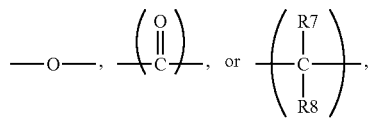

wherein R7 and R8 are independently H or $C_1$-$C_{12}$ alkyl.

Examples of the isocyanurate containing vinyl or allyl include but are not limited to triallyl isocyanurate (TAIC) and triallyl cyanurate (TAC). Each of the aforementioned isocyanurates containing vinyl or allyl may be used alone or in combination. In some embodiments of the present invention, triallyl isocyanurate (TAIC) is used.

Examples of the elastomer containing butadiene and/or styrene and having a functional group include but are not limited to homopolymers of butadiene, styrene-butadiene copolymers (SBR), styrene-butadiene-styrene copolymers (SBS), acrylonitrile-butadiene copolymers, hydrogenated styrene-butadiene-styrene copolymers, styrene-isoprene-styrene copolymers (SIS), hydrogenated styrene-isoprene-styrene copolymers, hydrogenated styrene (butadiene/isoprene) styrene copolymers, and polystyrene. Each of the aforementioned elastomers may be used alone or in combination. In some embodiments of the present invention, at least one of butadiene homopolymers and styrene-butadiene copolymers is used.

Examples of the epoxy resin include but are not limited to epoxy resins of the following formula (V).

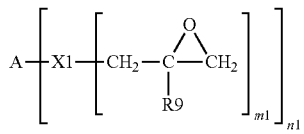

formula (V)

In formula (V), A is an organic or inorganic group with a valence of n1, R9 is H or $C_1$-$C_6$ alkyl, X1 is oxygen or nitrogen, m1 is 1 or 2 and consistent with the valence of X1, and n1 is an integer from 1 to 100. Preferably, n1 is an integer from 2 to 8; and most preferably, n1 is an integer from 2 to 4.

Suitable epoxy resins may include products produced by the reaction of epichlorohydrin or epibromohydrin with phenolic compounds. For example, suitable phenolic compounds include but are not limited to resorcinol, catechol, hydroquinone, 2,6-dihydroxy naphthalene, 2,7-dihydroxynapthalene, 2-(diphenylphosphoryl)hydroquinone, bis (2,6-dimethylphenol), 2,2'-biphenol, 4,4-biphenol, 2,2',6,6'-tetramethylbiphenol, 2,2',3,3',6,6'-hexamethylbiphenol, 3,3', 5,5'-tetrabromo-2,2'6,6'-tetramethylbiphenol, 3,3'-dibromo-2,2',6,6'-tetramethylbiphenol, 2,2',6,6'-tetramethyl-3,3'-dibromobiphenol, 4,4'-isopropylidenediphenol (bisphenol A), 4,4'-isopropylidenebis(2,6-dibromophenol) (tetrabromo-bisphenol A), 4,4'-isopropylidenebis(2,6-dimethylphenol) (teramethylbisphenol A), 4,4'-isopropylidenebis(2-methyl-phenol), 4,4'-isopropylidenebis(2-allylphenol), 4,4'-(1,3-phenylenediisopropylidene)bisphenol (bisphenol M), 4,4'-isopropylidenebis(3-phenylphenol), 4,4'-(1,4-phenylenediisoproylidene)bisphenol (bisphenol P), 4,4'-ethylidenediphenol (bisphenol E), 4,4'-oxydiphenol, 4,4'-thiodiphenol, 4,4'-thiobis(2,6-dimethylphenol), 4,4'-sulfonyldiphenol, 4,4'-sulfonylbis(2,6-dimethylphenol), 4,4'-sulfinyldiphenol, 4,4'-(hexafluoroisoproylidene)bisphenol (Bisphenol AF), 4,4'-(1-phenylethylidene)bisphenol (Bisphenol AP), bis(4-hydroxyphenyl)-2,2-dichloroethylene (Bisphenol C), bis(4-hydroxyphenyl)methane (Bisphenol F), bis(2,6-dimethyl-4-hydroxyphenyl)methane, 4,4'-(cyclopentylidene)diphenol, 4,4'-(cyclohexylidene)diphenol (Bisphenol Z), 4,4'-(cyclododecylidene)diphenol, 4,4'-(bicyclo[2.2.1]heptylidene)diphenol, 4,4'-(9H-fluorene-9,9-diyl) diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5-,6'-diol (Spirobiindane), dihydroxybenzophenone (bisphenol K), tris(4-hydroxyphenyl)methane, tris(4-hydroxyphenyl) ethane, tris(4-hydroxyphenyl)propane, tris(4-hydroxyphenyl)butane, tris(3-methyl-4-hydroxyphenyl)methane, tris(3, 5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl) phenylphosphine oxide, dicyclopentadienylbis(2,6-dimethyl phenol), dicyclopentadienyl bis(2-methylphenol), and dicyclopentadienyl bisphenol. Specific synthesis method of the epoxy resin is not one of the features of the invention and can be performed by persons with ordinary skill in the art based on their ordinary skill after reading the disclosure of the subject application and therefore, will not be described in detail.

In addition to the above illustrated thermal-curable resins, the resin system (a) may optionally comprise other conventional thermal-curable resins, such as phenolic resins and styrene maleic anhydride (SMA) resins, with the proviso that the designated condition of dielectric loss (Df) is not violated. The other thermal-curable resins may have a reactive functional group. The "reactive functional group" in the context may be any group capable of conducting a curing reaction, such as hydroxyl groups, carboxyl groups, alkenyl groups, amino groups, and the like, but are not limited thereto.

Curing agents and/or catalysts may be optionally added into the resin system (a) to improve curing effects and promote curing reaction. For example, in the case that the resin system (a) comprises epoxy resins, suitable curing agents include but are not limited to amine compounds, anhydrides, benzenediol compounds, bisphenol resin, polyhydric phenol resin, and phenolic resins. Each of the curing agents may be used alone or in combination. Examples of the amine compound include aliphatic amine compounds, such as diethylene triamine (DETA), triethylene tetramine (TETA), tetraethylene pentamine (TEPA), diethylaminopropylamine (DEAPA), methylene diamine, piperidine, 4,4'-diaminodicyclohexylmethane, 1,4-diaminocyclohexane, or hexamethylenediamime; and aromatic amine compounds, such as m-phenylene diamine (MPDA), 4,4'-diaminodiphenylmethane (MDA), diaminodiphenylsulfone (DADPS), m-xylylene diamine (MXDA), N-aminoethylpyrazine (AEP), phenylmethyldimethylamine (BDMA), dimethylaminomethylphenol (DMP-10), tris(dimethylaminomethyl) phenol (DMP-30), p-phenylenediamine, 2,2'-bis(4-aminophenyl)propane, 2,6-diaminopyridine, benzidine, 4,4'-diaminophenyl oxide, bis(4-aminophenyl)phenylphosphine oxide, bis(4-aminophenyl)methylamine, 1,5-diaminonaphthalene, p-xylenediamine, 6,6'-diamine-2,2'-pyridyl, 4,4'-diaminobenzophenone, 4,4'-diaminoazobenzene, bis(4-aminophenyl)phenylmethane, 1,1-bis(4-aminophenyl)cyclohexane, 1,1-bis(4-amino-3-methylphenyl)cyclohexane, 2,5-bis(m-aminophenyl)-1,3,4-oxadiazole, 2,5-bis(p-aminophenyl)-1,3,4-oxadiazole, 2,5-bis(m-aminophenyl)thiazo(4,5-d)thiazole, 5,5'-di(m-aminophenyl)-(2,2')-bis-(1,3,4-oxadiazolyl), 4,4'-bis(p-aminophenyl)-2,2'-dithiazole, m-bis(4-p-aminophenyl-2-thiazolyl)benzene, 4,4'-diaminobenzanilide, 4,4'-diaminophenyl benzoate, N,N'-bis(4-aminobenzyl)-p-phenylenediamine, 4,4'-methylenebis(2-chloroaniline), diaminodiphenyl ether, melamine, 2-amino-s-triazine, 2-amino-4-phenyl-s-triazine, 2-amino-4,6-diethyl-s-triazine, 2-amino-4,6-diphenyl-s-triazine, 2-amino-4,6-bis(p-methoxyphenyl)-s-triazine, 2-amino-4-anilino-s-triazine, 2-amino-4-phenoxy-s-triazine, 2-amino-4-chloro-s-triazine, 2-amino-4-aminomethyl-6-chloro-s-triazine, 2-(p-aminophenyl)-4,6-dichloro-s-triazine, 2,4-diamino-s-triazine, 2,4-diamino-6-methyl-s-triazine, 2,4-diamino-6-phenyl-s-triazine, 2,4-diamino-6-benzyl-s-triazine, 2,4-diamino-6-(p-aminophenyl)-s-triazine, 2,4-diamino-6-(m-aminophenyl)-s-triazine, 4-amino-6-phenyl-s-triazine-2-ol, or 6-amino-s-triazine-2,4-diol. As for the catalyst, any conventional catalysts in the art may be used. Examples of the catalyst include but are not limited to benzoyl peroxide (BPO), dicumyl peroxide (DCP), and α,α'-bis(t-butylperoxy)diisopropyl benzene. Each of the catalysts may be used alone or in combination.

Persons with ordinary skill in the art may select suitable curing agents and/or catalysts and determine the amount of the selected curing agents and/or catalysts based on their ordinary skill and disclosure of the subject application. Since the selection and determination are not critical to the present invention, they will not be discussed in detail.

[Organic Compound (b)]

In the resin composition of the present invention, the organic compound (b) is a compound of the following formula (II) or (III).

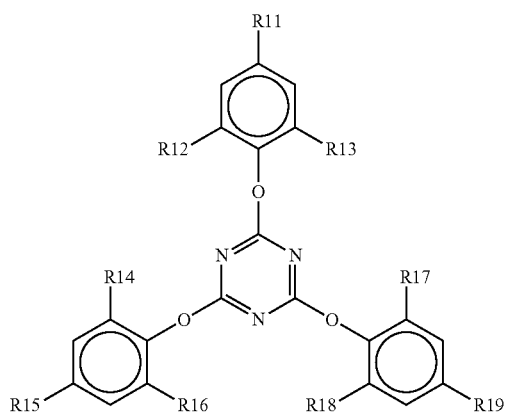

formula (II)

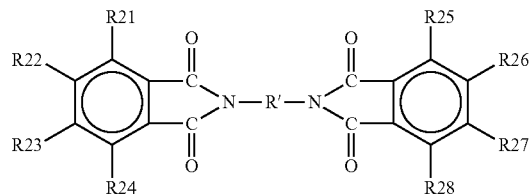

formula (III)

In formulas (II) and (III), R' is an organic group, and preferably —$C_2H_4$—, —$C_3H_7$—,

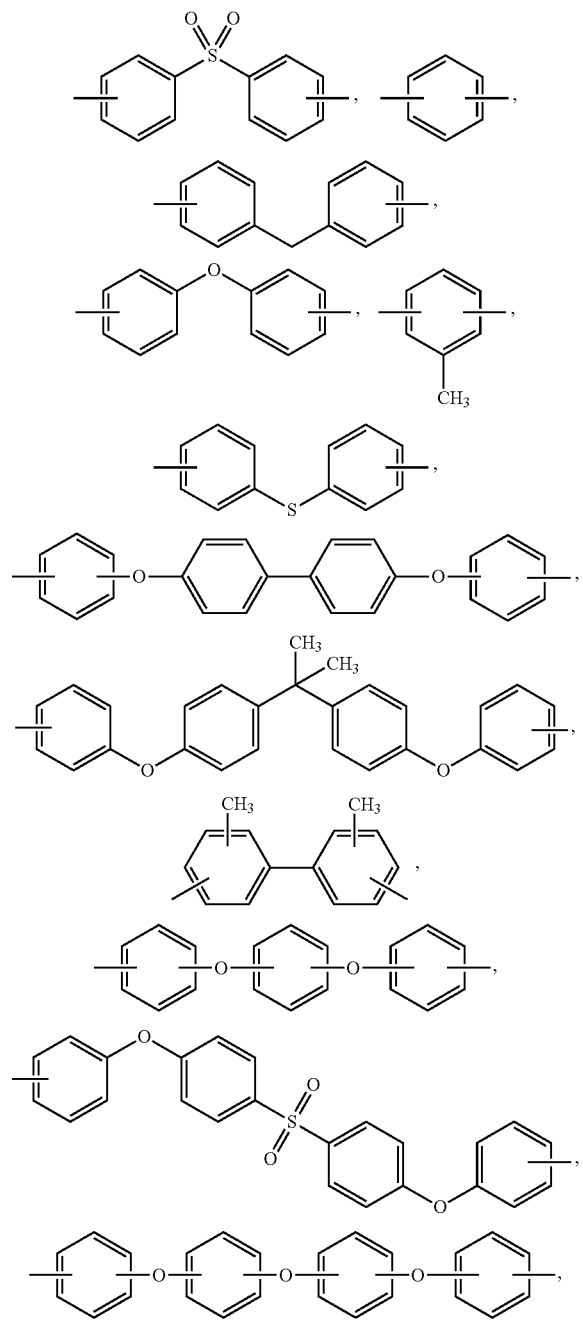

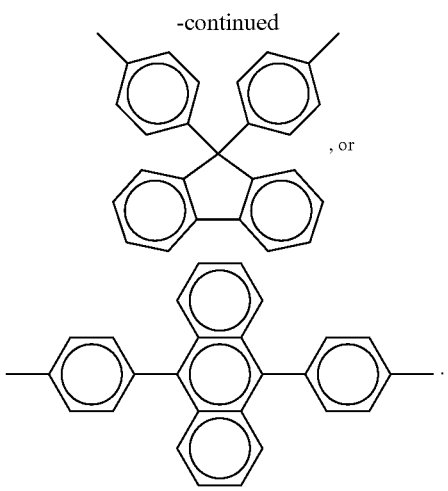

, or

R11 to R19 and R21 to R28 are independently selected from the group consisting of H, Br, and $C_1$-$C_6$ hydrocarbyl, and preferably Br. Without being restricted by any theories, it is believed that the organic compound could provide flame retardance to the resin composition when R11 to R19 and R21 to R28 are independently Br. In some embodiments of the present invention, R' is —$C_2H_4$—, and R11 to R19 and R21 to R28 are independently Br.

In the resin composition of the present invention, the organic compound (b) is in the form of powder and is insoluble in the resin system (a). It is found that when the particle size of the organic compound (b) in the resin composition is too large, the appearance of the laminate prepared by using the resin composition is bad. Therefore, the particle size of the organic compound (b) is preferably from 0.1 μm to 20 μm, and more preferably from 0.5 μm to 10 μm.

In the resin composition of the present invention, based on the total weight of the resin system (a) and the organic compound (b), the amount of the organic compound (b) ranges from 1 wt % to 30 wt %, preferably 10 wt % to 25 wt %, such as 11 wt %, 12 wt %, 15 wt %, 17 wt %, 20 wt %, or 24 wt %. If the amount of the organic compound (b) in the resin composition is higher than the designated range (e.g., higher than 30 wt %), the properties of the laminate prepared by using the resin composition, especially the peeling strength, will deteriorate. On the other hand, if the amount of the organic compound (b) in the resin composition is lower than the designated range (e.g., lower than 1 wt %), the properties of the laminate prepared by using the resin composition may not be satisfactory.

Optional Additives

The resin composition of the present invention may optionally further comprise other additives well-known to persons with ordinary skill in the art, such as curing promoters, flame retardants, fillers, dispersing agents, flexibilizers, etc., in addition to the resin system (a) and the organic compound (b). The curing promoter may promote the curing of the resin composition. The flame retardant may enhance the flame retardance of the material prepared thereby. The filler may improve particular physicochemical properties of the material prepared thereby.

Examples of the flame retardant include but are not limited to phosphorus-containing flame retardants, bromine-containing flame retardants, and combinations thereof. Examples of phosphorus-containing flame retardants include phosphatides, phosphazenes, ammonium polyphosphates, melamine polyphosphates, and melamine cyanurates. Examples of bromine-containing flame retardants include tetrabromobisphenol A, decabromodiphenyloxide, decabrominated diphenyl ethane, 1,2-bis(tribromophenyl) ethane, brominated epoxy oligomer, octabromotrimethylphenyl indane, bis(2,3-dibromopropyl ether), tris(tribromophenyl)triazine, brominated aliphatic or aromatic hydrocarbon.

Examples of the filler include but are not limited to silica, aluminum oxide, magnesium oxide, magnesium hydroxide, calcium carbonate, talc, clays, aluminum nitride, boron nitride, aluminum hydroxide, silicon aluminum carbide, silicon carbide, sodium carbonate, titanium dioxide, zinc oxide, zirconium oxide, quartzs, diamonds, diamond-like carbon, graphites, calcined kaolin, pry an, micas, hydrotalcite, hollow silica, polytetrafluroroethylene (PTFE) powders, glass beads, ceramic whiskers, carbon nanotubes, nanosized inorganic powders, and combinations thereof.

There is no limitation to the amount of each of the above additives and the amount can be determined depending on the needs by persons with ordinary skill in the art in accordance with their ordinary skill and the disclosure of the subject specification.

Preparation of Resin Composition

The resin composition of the present invention may be prepared into varnish form for subsequent applications by evenly mixing the resin system (a), the organic compound (b) and other optional additives through a stirrer and dissolving or dispersing the obtained mixture into a solvent. The solvent here can be any inert solvent which can dissolve (or disperse) but not react with the components of the resin composition of the present invention. Examples of the solvent which can dissolve or disperse the components of the resin composition of the present invention include but are not limited to toluene, γ-butyrolactone, methyl ethyl ketone, cyclohexanone, butanone, acetone, xylene, methyl isobutyl ketone, N,N-dimethylformamide (DMF), N,N-dimethylacetamide (DMAc), N-methyl-pyrolidone (NMP), and combinations thereof. The amount of the solvent is not particularly limited as long as the components of the resin composition can be evenly dissolved or dispersed therein. In some embodiments of the present invention, a mixture of toluene, methyl ethyl ketone and γ-butyrolactone is used as the solvent.

Prepreg

The present invention further provides a prepreg which is obtained by immersing a substrate (a reinforcing material) into the abovementioned resin composition and drying the immersed substrate. Examples of reinforcing material include glass fiber cloths (glass fabrics, glass papers, glass mats, etc.), kraft papers, short fiber cotton papers, nature fiber cloths, organic fiber cloths, etc. In some embodiments of the present invention, 2116 glass fiber cloths are illustrated as the reinforcing material, and the reinforcing material is heated and dried at 175° C. for 2 to 15 minutes (B-stage) to provide a half-hardened prepreg.

Laminate

The present invention further provides a laminate, which comprises a synthetic layer and a metal layer, wherein the synthetic layer is made from the above prepreg. The laminate may be prepared by the following process: superimposing a plurality of prepregs and superimposing a metal foil (such as a copper foil) on at least one external surface of the superimposed prepregs to provide a superimposed object; performing a hot-pressing operation onto the superimposed object to obtain the laminate. Moreover, a printed circuit board can be provided by further patterning the metal foil of the laminate.

The present invention will be further illustrated by the embodiments hereinafter, wherein the measuring instruments and methods are respectively as follows:

[Water Absorption Test]

The moisture resistance of the laminate is tested by a pressure cooker test (PCT), i.e., subjecting the laminate into a pressure container (121° C., 100% R.H. and 1.2 atm) for 2 hours.

[Solder Resistance Test]

The solder resistance test is carried out by immersing the dried laminate in a solder bath at 288° C. for a while and observing whether there is any defect such as delamination and expansion.

[Peeling Strength Test]

Peeling strength refers to the bonding strength between the metal foil and laminated prepreg, which is usually expressed by the force required for vertically peeling the clad copper foil with a width of ⅛ inch from the surface of the laminated prepreg.

[Glass Transition Temperature (Tg) Test]

Glass transition temperature (Tg) is measured by using a Differential Scanning calorimeter (DSC), wherein the measuring methods are IPC-TM-650.2.4.25C and 24C testing method of the Institute for Interconnecting and Packaging Electronic Circuits (IPC).

[Flame Retardance Test]

The flame retardance test is carried out according to UL94V (Vertical Burn), which comprises the burning of a laminate, which is held vertically, using a Bunsen burner to compare its self-extinguishing properties and combustion-supporting properties.

[Dielectric Constant (Dk) and Dissipation Factor (Df) Measurement]

Dk and Df are measured according to ASTM D150 under an operating frequency of 10 GHz.

EXAMPLES

<Preparation of Resin System (a)>
<Resin System (a1)>

According to the ratio shown in Table 1, bismaleimide resin of formula (I) (M1 is

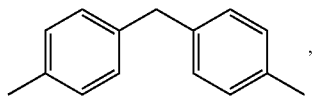

each Z1 is independently H; trade name: BMI, available from K.I CHEMICAL Company), polyphenylene ether derivative resin of formula (IV) (X has the structure of formula (IV-1), Y has the structure of formula (IV-2), wherein B1 and B2 are

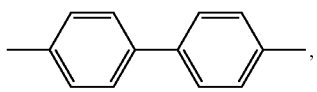

R5 and R6 are absent, and $1 \leq p+q < 3$, R1, R2, R3, and R4 are methyl, A1 and A2 are

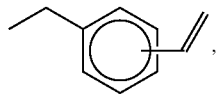

Z is absent, and $20 \leq (m1+n1) \leq 25$; trade name: PP807, available from Jin-Yi Company), and TAIC (available from Evonik Company) were mixed under room temperature with a stirrer followed by adding toluene, methyl ethyl ketone and γ-butyrolactone (all available from Fluka Company) thereinto. After stirring the resultant mixture under room temperature for about 60 to 120 minutes, resin system (a1) was obtained.

<Resin System (a2)>

According to the ratio shown in Table 1, bismaleimide resin BMI, polyphenylene ether derivative resin PP807, polyphenylene ether derivative resin available from Sabic Company (trade name: SA9000), isocyanurate TAIC, homopolymer of butadiene (trade name: Ricon 130, available from CRAY VALLEY Company) as the elastomer, and benzoyl peroxide (BPO, available from Fluka Company) as the catalyst were mixed under room temperature with a stirrer followed by adding toluene, methyl ethyl ketone and γ-butyrolactone thereinto. After stirring the resultant mixture under room temperature for about 60 to 120 minutes, resin system (a2) was obtained.

<Resin System (a3)>

The preparation procedures of resin system (a2) were repeated to prepare resin system (a3), except that polyphenylene ether derivative resin PP807 and polyphenylene ether derivative resin SA9000 were substituted by polyphenylene ether derivative resin available from Mitsubishi Gas Chemical Company (trade name: OPE-2st), butadiene-styrene random copolymer (trade name: Ricon 181, available from CRAY VALLEY Company) as the elastomer was further added, and the amounts of bismaleimide resin, polyphenylene ether derivative resin, and elastomer were adjusted as shown in Table 1.

<Resin System (a4)>

The preparation procedures of resin system (a2) were repeated to prepare resin system (a4), except that polyphenylene ether derivative resin PP807 was not used, bisphenol A type epoxy resin (trade name: BE-188EL, available from CCP Company) and methylenebis (2-ethyl-6-methylaniline) (MED, available from IHARA CHMICAL Ind.) as the curing agent were further added, and the amounts of the polyphenylene ether derivative resin and the elastomer were adjusted as shown in Table 1.

<Resin System (a5)>

The preparation procedures of resin system (a2) were repeated to prepare resin system (a5), except that polyphenylene ether derivative resin SA9000 was substituted by polyphenylene ether derivative resin OPE-2st, dicyclopentadiene type epoxy resin (trade name: HP-7200H, available from DIC Company) and phenol (available from ChangChun Chemical Company) as the curing agent were further added, and the amount of the elastomer was adjusted as shown in Table 1.

<Resin System (a6)>

The preparation procedures of resin system (a3) were repeated to prepare resin system (a6), except that polyphenylene ether derivative resin SA9000 was further added, and the amounts of bismaleimide resin, polyphenylene ether derivative resin, and elastomer were adjusted as shown in Table 1.

<Resin System (a7)>

The preparation procedures of resin system (a1) were repeated to prepare resin system (a7), except that TAIC was not added, and elastomer Ricon 130 and catalyst BPO were further added as shown in Table 1.

To measure the Df values of the resin systems, electrometric samples were prepared by using resin systems (a1) to (a7), respectively. Resin systems (a1) to (a7) were coated on copper foils by a horizontal knife of a horizontal coater, respectively, and the coated copper foils were then placed in an oven and dried at 175° C. for 2 to 10 minutes to prepare resin coated copper foils in a half-cured state. Next, a hot-pressing operation was performed on each of the resin coated copper foils (in a half-cured state) with another sheet of copper foil (0.5 oz.). Herein, the hot-pressing conditions are as follows: raising the temperature to about 200° C. to 220° C. with a heating rate of 3.0° C./min, and hot-pressing for 180 minutes under the full pressure of 15 kg/cm$^2$ (initial pressure is 8 kg/cm$^2$) at said temperature. Then, the Df values of resin systems (a1) to (a7) were measured at 10 GHz. As shown in Table 1, the Df values of resin systems (a1) to (a7) at 10 GHz are all lower than 0.008.

(II) (R11 to R19 are independently Br; chemical name: 2,4,6-Tris(2,4,6-tribromophenoxy)-1,3,5 triazine; trade name: FR-245, available from ICL Company), and silica powders as the filler were mixed under room temperature with a stirrer for 120 minutes to obtain resin composition 3.

Example 4

The preparation procedures of Example 3 were repeated to prepare resin composition 4, except that resin system (a3) was used as the resin system (a), and the amounts of the organic compound (b) and the filler were adjusted as shown in Table 2.

Example 5

The preparation procedures of Example 1 were repeated to prepare resin composition 5, except that resin system (a4) was used as the resin system (a), and the amounts of the organic compound (b) and the filler were adjusted as shown in Table 2.

TABLE 1 composition of resin systems

| Unit: parts by weight | | Resin system (a1) | (a2) | (a3) | (a4) | (a5) | (a6) | (a7) |
|---|---|---|---|---|---|---|---|---|
| Bismaleimide resin | BMI | 10 | 10 | 15 | 10 | 10 | 20 | 20 |
| Polyphenylene ether resin | PP807 | 60 | 30 | — | — | 30 | — | 60 |
| | SA9000 | — | 30 | — | 60 | — | 30 | — |
| | OPE-2st | — | — | 60 | — | 30 | 30 | — |
| Isocyanurate | TAIC | 20 | 20 | 20 | 20 | 20 | 20 | — |
| Elastomer | Ricon 130 | — | 20 | 10 | 5 | 15 | 10 | 20 |
| | Ricon 181 | — | — | 10 | — | — | 5 | — |
| Epoxy resin | HP-7200H | — | — | — | — | 11 | — | — |
| | BE-188EL | — | — | — | 30 | — | — | — |
| Curing agent | Phenol | — | — | — | — | 6 | — | — |
| | MED | — | — | — | 12 | — | — | — |
| Catalyst | BPO | — | 0.3 | 0.3 | 0.3 | 0.3 | 0.3 | 0.5 |
| Df@10 GHz | | 0.0035 | 0.0027 | 0.0028 | 0.0074 | 0.0046 | 0.0030 | 0.0031 |

<Preparation of Resin Composition>

Example 1

According to the ratio shown in Table 2, resin system (a1) as the resin system (a), the organic compound (b) of formula (III) (R' is ethyl and R21 to R28 are independently Br; chemical name: ethylene-bis(tetrabromo phthalimide); trade name: BT-93, available from Albemarle Company), and silica powders (available from Sibelco Company) as the filler were mixed under room temperature with a stirrer for 120 minutes to obtain resin composition 1.

Example 2

The preparation procedures of Example 1 were repeated to prepare resin composition 2, except that resin system (a3) was used as the resin system (a), and the amounts of the organic compound (b) and the filler were adjusted as shown in Table 2.

Example 3

According to the ratio shown in Table 2, resin system (a2) as the resin system (a), the organic compound (b) of formula

Example 6

The preparation procedures of Example 1 were repeated to prepare resin composition 6, except that resin system (a5) was used as the resin system (a), and the amounts of the organic compound (b) and the filler were adjusted as shown in Table 2.

Example 7

The preparation procedures of Example 1 were repeated to prepare resin composition 7, except that resin system (a6) was used as the resin system (a), and the amounts of the organic compound (b) and the filler were adjusted as shown in Table 2.

Example 8

The preparation procedures of Example 3 were repeated to prepare resin composition 8, except that resin system (a6) was used as the resin system (a), and the amounts of the organic compound (b) and the filler were adjusted as shown in Table 2.

Example 9

The preparation procedures of Example 3 were repeated to prepare resin composition 9, except that resin system (a7) was used as the resin system (a), and the amounts of the organic compound (b) and the filler were adjusted as shown in Table 2.

Comparative Example 1

The preparation procedures of Example 3 were repeated to prepare comparative resin composition 1, except that the amount of the organic compound (b) was adjusted to exceed the range (1 to 30 wt %) designated by the present invention, and the amount of the filler was adjusted as shown in Table 2.

Comparative Example 2

According to the ratio shown in Table 2, resin system (a3) as the resin system (a), decabromodiphenyl ethane (trade name: SAYTEX 8010, available from Albemarle Company), and silica powders as the filler were mixed under room temperature with a stirrer for 120 minutes to obtain comparative resin composition 2.

Comparative Example 3

The preparation procedures of Comparative Example 2 were repeated to prepare comparative resin composition 3, except that the amount of decabromodiphenyl ethane was adjusted as shown in Table 2.

Comparative Example 4

The preparation procedures of Example 7 were repeated to prepare comparative resin composition 4, except that the amount of the organic compound (b) was adjusted to exceed the range (1 to 30 wt %) designated by the present invention as shown in Table 2.

TABLE 2

| | | | composition of resin composition | | | |
|---|---|---|---|---|---|---|
| | | Resin system (a) | Organic compound (b) (parts by weight) | | SAYTEX 8010 (parts by weight) | Silica powder (parts by weight) |
| | | | BT-93 | FR-245 | | |
| Example | 1 | (a1) | 20 | — | — | 50 |
| | 2 | (a3) | 24 | — | — | 52 |
| | 3 | (a2) | — | 24 | — | 52 |
| | 4 | (a3) | — | 27 | — | 58 |
| | 5 | (a4) | 30 | — | — | 57 |
| | 6 | (a5) | 26 | — | — | 55 |
| | 7 | (a6) | 35 | — | — | 54 |
| | 8 | (a6) | — | 25 | — | 54 |
| | 9 | (a7) | — | 22 | — | 50 |
| Comparative Example | 1 | (a2) | — | 50 | — | 50 |
| | 2 | (a3) | — | — | 22 | 58 |
| | 3 | (a3) | — | — | 45 | 58 |
| | 4 | (a6) | 70 | — | — | 54 |

[Preparation of Laminate]

Laminates 1 to 9 and comparative laminates 1 to 4 were prepared by using resin compositions 1 to 9 and comparative resin compositions 1 to 4, respectively. In detail, one of the resin compositions was coated on 2116 reinforced glass fiber cloths by a roller. The coated 2116 reinforced glass fiber cloths were then placed in an oven and dried at 175° C. for 2 to 15 minutes to produce prepregs in a half-cured state (resin content: about 53%). Four pieces of the prepregs were superimposed and two sheets of copper foil (0.5 oz.) were respectively superimposed on the two external surfaces of the superimposed prepregs to provide a superimposed object. A hot-pressing operation was performed on each of the prepared objects to provide laminates 1 to 9 (corresponding to resin compositions 1 to 9, respectively) and comparative laminates 1 to 4 (corresponding to comparative resin compositions 1 to 4, respectively). Herein, the hot-pressing conditions are as follows: raising the temperature to about 200° C. to 220° C. with a heating rate of 3.0° C./min, and hot-pressing for 180 minutes under the full pressure of 15 kg/cm$^2$ (initial pressure is 8 kg/cm$^2$) at said temperature.

The water absorption, solder resistance, peeling strength, glass transition temperature (Tg), flame retardance, dissipation factor (Df), and dielectric constant (Dk) of laminates 1 to 9 and comparative laminates 1 to 4 were analyzed and the results are tabulated in Table 3.

TABLE 3

| | | properties of laminates | | | | | | |
|---|---|---|---|---|---|---|---|---|
| Unit | | Water absorption % | Solder resistance minute | Peeling strength pound/inch | Tg ° C. | Flame retardance UL grade | Df 10 GHz | Dk 10 GHz |
| Laminate | 1 | 0.36 | >10 | 3.9 | 228 | V0 | 0.0049 | 3.88 |
| | 2 | 0.35 | >10 | 4.1 | 219 | V0 | 0.0044 | 3.84 |
| | 3 | 0.34 | >10 | 4.1 | 218 | V0 | 0.0044 | 3.83 |
| | 4 | 0.35 | >10 | 4.3 | 221 | V0 | 0.0043 | 3.82 |
| | 5 | 0.47 | >10 | 4.3 | 203 | V0 | 0.0083 | 3.99 |
| | 6 | 0.42 | >10 | 4.1 | 206 | V0 | 0.0063 | 3.94 |
| | 7 | 0.35 | >10 | 3.8 | 223 | V0 | 0.0045 | 3.86 |
| | 8 | 0.35 | >10 | 4.2 | 222 | V0 | 0.0045 | 3.86 |
| | 9 | 0.36 | >10 | 3.9 | 220 | V0 | 0.0047 | 3.87 |
| Comparative laminate | 1 | 0.35 | >10 | 2.9 | 218 | V0 | 0.0048 | 3.88 |
| | 2 | 0.35 | >10 | 3.3 | 215 | V0 | 0.0049 | 3.89 |
| | 3 | 0.35 | >10 | 2.4 | 216 | V0 | 0.0050 | 3.89 |
| | 4 | 0.36 | >10 | 2.0 | 220 | V0 | 0.0050 | 3.89 |

As shown in Table 3, laminates 1 to 9 manufactured by using the resin compositions of the present invention are provided with satisfactory physicochemical properties and electrical properties (such as water absorption, flame retardance, Dk, and D0 and outstanding heat resistance (high Tg and excellent solder resistance). Thus, the resin composition of the present invention can be more extensively used. In particular, the laminates prepared by using the resin composition of the present invention are provided with excellent peeling strength (3.8 pounds/inch or more). On the contrary, as shown in Comparative Examples 1 and 4, it is surprising that if the amount of the organic compound (b) exceeds the range designated by the present invention, even though the amount of the organic compound (b) is increased, the peeling strength of the resultant laminates will decrease sharply (only 2.9 pounds/inch for comparative laminate 1, and even low to 2.0 pounds/inch for comparative laminate 4). Furthermore, as shown in Comparative Examples 2 and 3, when the organic compound (b) is not added in the resin composition, even though the flame retardance of the laminates may be achieved to V-0 level through adding a flame retardant (e.g., decabromodiphenyl ethane), the peeling strength of the laminates thus prepared remains poor (only 3.3 pounds/inch for comparative laminate 2, and even low to 2.4 pounds/inch for comparative laminate 3).

The above examples are used to illustrate the principle and efficacy of the present invention and show the inventive features thereof. People skilled in this field may proceed with a variety of modifications and replacements based on the disclosures and suggestions of the invention as described without departing from the principle and spirit thereof. Therefore, the scope of protection of the present invention is that as defined in the claims as appended.

What is claimed is:

1. A resin composition, comprising:
(a) a thermal-curable resin system, which has a dielectric loss (Df) of not higher than 0.008 at 10 GHz and comprises a bismaleimide resin of the following formula (I),

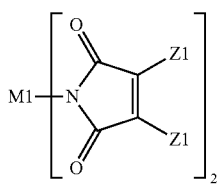

formula (I)

wherein M1 is an organic group, and each Z1 is independently H, halogen, or $C_1$-$C_5$ alkyl; and (b) an organic compound of the following formula (II),

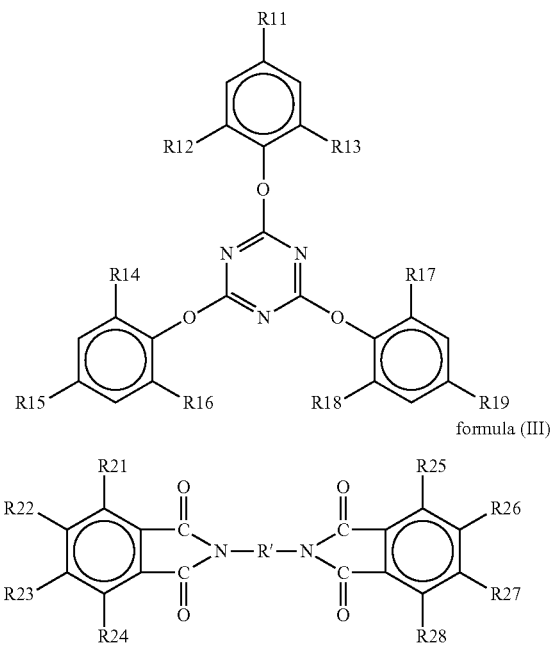

formula (II)

formula (III)

wherein R11 to R19 are independently selected from the group consisting of H, Br, and $C_1$-$C_6$ hydrocarbyl, and wherein the amount of the organic compound (b) ranges from 10 wt % to 25 wt % based on the total weight of the resin system (a) and the organic compound (b).

2. The resin composition of claim 1, wherein M1 is substituted or unsubstituted methylene, 4,4'-diphenylmethane, m-phenylene, bisphenol A diphenyl ether, 3,3'-dimethyl-5,5'-diethyl-4,4'-diphenyl methane, 4-methyl-1,3-phenylene, or (2,2,4-trimethyl)hexane.

3. The resin composition of claim 2, wherein the resin system (a) further comprises thermal-curable resin(s) selected from the group consisting of polyphenylene ether derivative resins with acrylic acid group(s), polyphenylene ether derivative resins with vinyl group(s), polyphenylene ether derivative resins with hydroxyl group(s), triallyl isocyanurate (TAIC), triallyl cyanurate (TAC), homopolymers of butadiene, styrene-butadiene copolymers (SBR), styrene-butadiene-styrene copolymers (SBS), acrylonitrile-butadiene copolymers, hydrogenated styrene-butadiene-styrene copolymers, styrene-isoprene-styrene copolymers (SIS), hydrogenated styrene-isoprene-styrene copolymers, hydrogenated styrene (butadiene/isoprene) styrene copolymers, polystyrene, epoxy resins, and combinations thereof.

4. The resin composition of claim 2, further comprising one or more additives selected from the group consisting of curing promoters, flame retardants other than an organic compound of formula (II), fillers, dispersing agents, and flexibilizers.

5. The resin composition of claim 1, wherein the organic compound (b) has an average particle size (D50) ranging from 0.1 μm to 20 μm.

6. The resin composition of claim 5, wherein the resin system (a) further comprises thermal-curable resin(s) selected from the group consisting of polyphenylene ether derivative resins with acrylic acid group(s), polyphenylene ether derivative resins with vinyl group(s), polyphenylene ether derivative resins with hydroxyl group(s), triallyl isocyanurate (TAIC), triallyl cyanurate (TAC), homopolymers of butadiene, styrene-butadiene copolymers (SBR), styrene-butadiene-styrene copolymers (SBS), acrylonitrile-butadiene copolymers, hydrogenated styrene-butadiene-styrene copolymers, styrene-isoprene-styrene copolymers (SIS), hydrogenated styrene-isoprene-styrene copolymers, hydrogenated styrene (butadiene/isoprene) styrene copolymers, polystyrene, epoxy resins, and combinations thereof.

7. The resin composition of claim 1, wherein the resin system (a) further comprises thermal-curable resin(s) selected from the group consisting of polyphenylene ether derivative resins with acrylic acid group(s), polyphenylene ether derivative resins with vinyl group(s), polyphenylene ether derivative resins with hydroxyl group(s), triallyl isocyanurate (TAIC), triallyl cyanurate (TAC), homopolymers of butadiene, styrene-butadiene copolymers (SBR), styrene-butadiene-styrene copolymers (SBS), acrylonitrile-butadiene copolymers, hydrogenated styrene-butadiene-styrene copolymers, styrene-isoprene-styrene copolymers (SIS), hydrogenated styrene-isoprene-styrene copolymers, hydrogenated styrene (butadiene/isoprene) styrene copolymers, polystyrene, epoxy resins, and combinations thereof.

8. The resin composition of claim 1, further comprising one or more additives selected from the group consisting of curing promoters, flame retardants other than an organic compound of formula (II), fillers, dispersing agents, and flexibilizers.

9. The resin composition of claim 8, wherein the flame retardants are phosphorus-containing flame retardants, bromine-containing flame retardants, or a combination thereof.

10. The resin composition of claim 8, wherein the fillers are selected from the group consisting of silica, aluminum oxide, magnesium oxide, magnesium hydroxide, calcium carbonate, talc, clays, aluminum nitride, boron nitride, aluminum hydroxide, silicon aluminum carbide, silicon carbide, sodium carbonate, titanium dioxide, zinc oxide, zirconium oxide, quartzs, diamonds, diamond-like carbon, graphites, calcined kaolin, pryan, micas, hydrotalcite, hollow silica, polytetrafluroroethylene (PTFE) powders, glass beads, ceramic whiskers, carbon nanotubes, nanosized inorganic powders, and combinations thereof.

11. A prepreg, which is prepared by immersing a substrate into the resin composition of claim 1, and drying the immersed substrate.

12. A laminate, comprising a synthetic layer and a metal layer, wherein the synthetic layer is made from the prepreg of claim 11.

* * * * *